United States Patent [19]

Nussbaum

[11] Patent Number: 4,830,892
[45] Date of Patent: May 16, 1989

[54] MOLDING WITH INSERT OF THREE-DIMENSIONAL MARKINGS WITH INJECTION MOLDED CLEAR OVERLAYER

[75] Inventor: Joel H. Nussbaum, Farmington Hills, Mich.

[73] Assignee: The Standard Products Company, Cleveland, Ohio

[21] Appl. No.: 94,336

[22] Filed: Sep. 8, 1987

[51] Int. Cl.⁴ .............................................. B60R 13/04
[52] U.S. Cl. ..................................... 428/31; 156/293; 293/128; 428/67; 428/187
[58] Field of Search ...................... 428/31, 67, 187, 13; 156/293; 293/128

[56] References Cited

U.S. PATENT DOCUMENTS

| | | | |
|---|---|---|---|
| 2,071,921 | 2/1937 | Dickson | 428/139 |
| 2,731,672 | 1/1956 | Davis et al. | 428/13 X |
| 2,863,241 | 12/1958 | Gits | 428/187 X |
| 3,046,174 | 7/1962 | Brooks et al. | 428/159 X |
| 3,456,043 | 7/1969 | Emery | 428/187 X |
| 3,914,482 | 10/1975 | Sawa et al. | 428/31 |
| 4,172,331 | 10/1979 | Becker | 428/31 X |
| 4,175,156 | 11/1979 | Ikins | 428/31 X |
| 4,275,099 | 6/1981 | Dani | 428/483 X |
| 4,319,417 | 3/1982 | Schimmel | 428/187 X |
| 4,349,592 | 9/1982 | Nussbaum | 428/122 X |
| 4,446,179 | 5/1984 | Waugh | 428/67 X |
| 4,566,929 | 1/1986 | Waugh | 428/31 X |

Primary Examiner—Henry F. Epstein
Attorney, Agent, or Firm—Harness, Dickey & Pierce

[57] ABSTRACT

A molding strip having an integrally formed insert with indicia is disclosed. The molding strip includes an elongated plastic strip having an aperture formed therein. An insert is positioned in the aperture. Indicia, such as trademarks, tradenames, insignias, logos, designs or the like, are formed on the insert. A transparent overlayer is injected onto the insert for integrally bonding and securing the insert with the elongated strip. The overlayer enables the indicia to exhibit aesthetic three-dimensional characteristics when viewed by an observer. Also disclosed is a method for manufacturing the present invention.

16 Claims, 1 Drawing Sheet

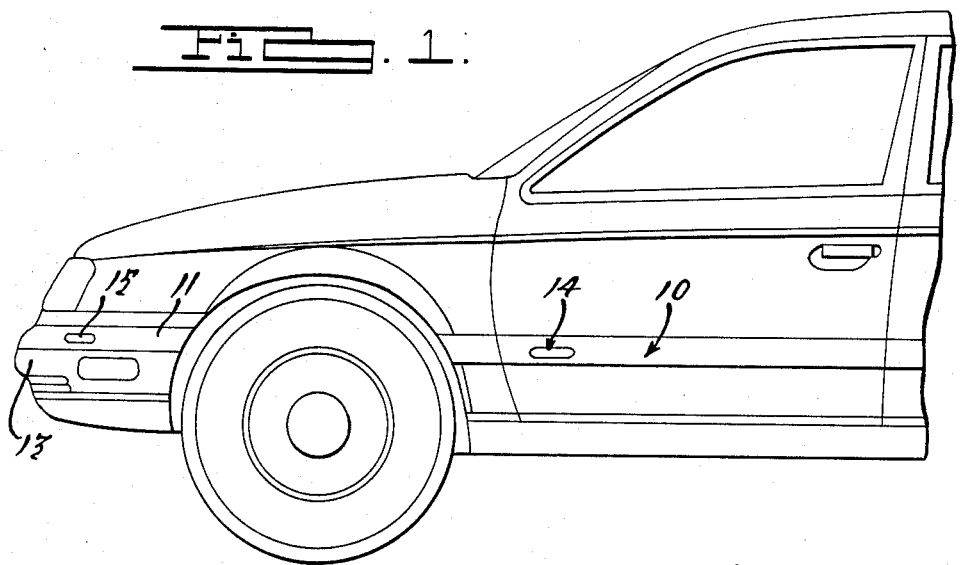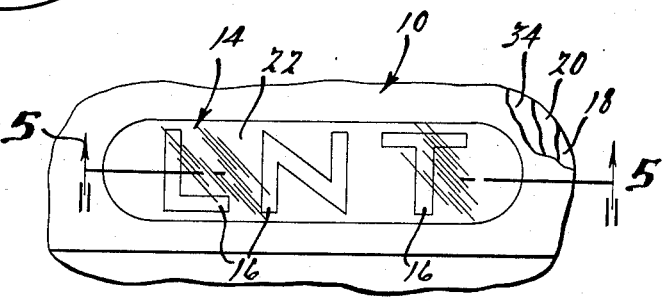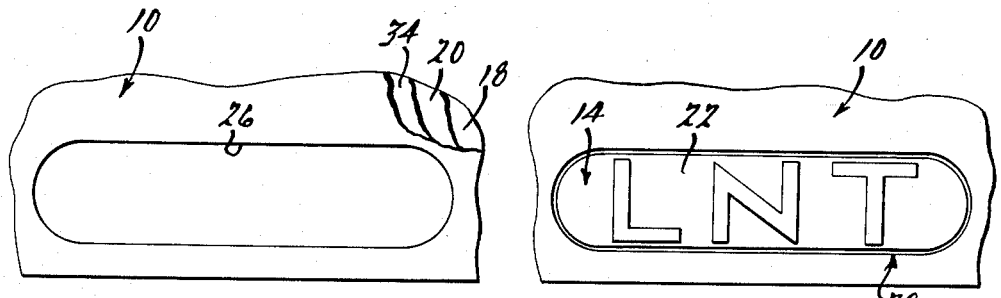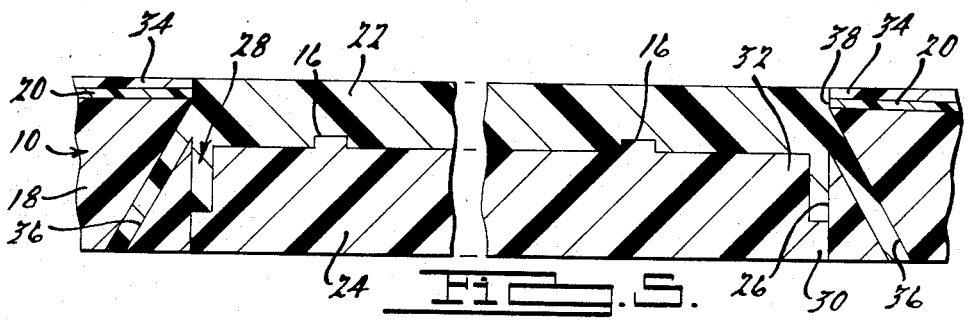

MOLDING WITH INSERT OF THREE-DIMENSIONAL MARKINGS WITH INJECTION MOLDED CLEAR OVERLAYER

BACKGROUND AND SUMMARY OF THE INVENTION

The present invention relates to molding. More particularly, the invention relates to molding or fascia trim, especially for automotive vehicles, having an insert with markings or indicia thereon and exhibiting three-dimensional characteristics.

Moldings for automotive vehicles are commonly used, for example, as body side moldings to protect the sides of vehicles from nicks, scratches and dents, of the type inflicted in parking lots by the careless. Moldings are also used as fascia trim and can serve aesthetic purposes to enhance the lines of vehicles. Some vehicle manufacturers provide moldings with bright work to simulate a bright metallic appearance which is pleasing to the eye. In fact, a variety of shapes and configurations of moldings have been developed through the years in efforts to improve the aesthetic characteristics of the molding and to improve the aesthetic appeal of the vehicle to which the moldings are attached.

It is also quite popular to provide the sides of vehicles with some form of emblem or indicia, such as a trademark, tradename, insignia, logo, design or the like. Conventionally, such emblems are secured to vehicles by pressure sensitive adhesives or with fasteners which require drilling holes in the body panels. These conventional techniques result in an emblem which protrudes from the body of the vehicle, detracting from the aerodynamic appearance. Also adhesively secured emblems are subject to theft. Emblems attached to the body with fasteners secured through holes in the body panels increase the likelihood of body rust at the holes. These disadvantages are overcome by the present invention which incorporates an emblem into a molding.

The present invention provides a new and improved molding strip and method of making the same in which an indicia bearing insert is positioned within an aperture in the molding strip. A transparent plastic overlayer is injected over the insert, sealing the insert in place and forming an exposed surface which is smooth and continuous with the exposed surface of the molding strip. The indicia are viewable through the transparent overlayer and may be formed as three-dimensional raised indicia to exhibit aesthetic three-dimensional characteristics.

In accordance with the inventive method, the molding strip is cut, stamped or formed with an aperture into which the indicia bearing insert is positioned. Plastic material is injected into the aperture so that it overlays or encapsulates the insert and bonds to the insert to produce an integrally formed molding strip. The molding strip may be extruded and then placed in a mold or formed in a mold. Thereafter plastic material forming the overlayer is injected through passageways drilled or formed in the molding strip adjacent the insert receiving aperture and communicating with the mold cavity space proximate the insert. The injected plastic material substantially fills the mold cavity space proximate the insert and forms a good mechanical bond to hold the insert in place within the aperture. The injected plastic material also fuses with the insert and molding strip. If desired, the molding strip can be provided with a decorative metallized film layer. The injected plastic material serves to encapsulate and protect the edges of the metallized film exposed as a result of forming the aperture. This prevents the metallized film edges from deteriorating or oxidizing due to exposure to the elements. The plastic injected material forms a smooth and continuous surface integral with the surface of the molding strip, which avoids accumulation of dirt, road salt and the like from such as occurs in crevices or recessed logos on conventional emblems or moldings.

For a more complete understanding of the invention, its objects and advantages, reference may be had to the following specification and the accompanying drawings.

BRIEF DESCRIPTION OF THE DRAWINGS

FIG. 1 is a side elevation view of a portion of a vehicle including a molding strip in accordance with the present invention;

FIG. 2 is an enlarged partial plan view illustrating the molding strip insert of the invention;

FIG. 3 is a similar enlarged partial plan view showing the aperture in the molding strip prior to insertion of the insert;

FIG. 4 is a similar partial plan view illustrating the insert positioned in the aperture prior to injection of the overlayer material; and FIG. 6 is a cross-sectional view taken along the line 5—5 of FIG. 2, illustrating the molding strip with insert and injected overlayer in greater detail.

DESCRIPTION OF THE PREFERRED EMBODIMENT

Referring to FIG. 1, an automotive body side molding is illustrated generally at 10. Molding 10 is secured to the fender panels and door panels of the automotive vehicle generally in the position shown. Although the molding strip 10 has been illustrated as a protective body side molding for the vehicle, it will be appreciated that the present invention can be employed in molding strips for other purposes. For example, the present invention can be a bumper fascia 11 illustrated in FIG. 1 on bumper 13.

Molding strip 10 includes an emblem or indicia 14, which may be a logo, trademark, tradename, insignia, design or the like. An analogous emblem 15 is illustrated on bumper fascia 11. Indicia 14 are shown in greater detail in FIG. 2. As illustrated, indicia 14 may include one or more letters 16 (or logos, designs and so forth). If desired, molding strip 10 may be in the form of a substrate 18 having a metallized film 20 secured or bonded thereon. Metallized films can be used to stimulate a bright metallic appearance which is pleasing to the eye. For illustration purposes, a portion of metallized film 20 is shown cut away in FIG. 2 to reveal the underlying substrate 18. Substrate 18 can comprise polyvinylchloride or any other conventional material suitable for the intended use of molding strip 10. Indicia 14 further includes a clear or tinted transparent plastic overlayer 22 which fully covers the letters 16 and presents an outwardly facing or exposed surface which is smooth and continuous with the outwardly facing exposed surface of molding strip 10. Overlayer 22 can be, for example, a clear or tinted polyvinylchloride material. Optionally, overlayer 22 can comprise a clear polymer material which exhibits lens magnification properties to make the indicia appear larger than actual size. As will be more fully explained below, letters 16 are integrally formed on or secured to an insert member 24 which is positioned within an aperture formed in the molding strip. To give a three-dimensional appearance, letters 16 may be raised above the surface of the insert member. Insert member 24 can be fabricated from polyvinylchloride or other suitable material. Letters 16 can be painted or can comprise a laminate such as brushed aluminized polyester film, for example.

Referring to FIGS. 3, 4 and 5, the method of making a molding strip of the invention will now be described. FIG. 3 depicts molding strip 10 into which an aperture 26 is formed. Molding strip may be extruded or injection molded and may include a metallized film layer 20 and underlying substrate 18 as discussed above. Aperture 26 may be formed during molding or it may be stamped or cut after formation of the molding strip. However formed, aperture 26 demarks the termination of metallized film layer 20 if such layer is present. In the presently preferred embodiment no special treatment of this terminating edge of film layer 20 is required to prevent oxidation or corrosion of the metallized film because of the encapsulating and protective effects of the overlayer 22. While the aperture 26 has been depicted as an elongated slot having rounded ends, other shapes are equally possible.

Referring to FIG. 4, the next step in manufacturing the molding strip is to position insert member 24 into aperture 26. Insert member 24 is of a similar size and shape to aperture 26. The outwardly facing portion of insert member 24 is somewhat smaller in circumferential size so that there is a gap 28 defined between substrate 18 and the insert member 24.

FIG. 5 depicts the insert member 24 in greater detail. As seen, insert member 24 has a lower portion 30 which conforms closely to the size and shape of aperture 26. The upper portion 32 is of a reduced circumferential size to create the gap 28. Of course, it will be appreciated by those skilled in the art that gap 28, while preferred as increasing the surface of insert member 24 for bonding, is not necessary. Letters 16 can be raised letters as shown.

FIG. 5 also illustrates the makeup of molding strip 10 in greater detail. Molding strip 10 includes substrate 18 upon which a metallized film layer 20 is provided. In practice, the metallized film layer itself comprises a plastic substrate upon which a thin metallized layer or foil layer is secured. As metallized film is conventional, the precise details of the film have been omitted from the drawings to simplify them. Deposited or bonded on top of metallized film layer 20 is a clear or tinted transparent plastic cover layer 34. This layer may be added during the initial fabrication of the molding strip stock, or it may be applied later or concurrently with the application of the metallized film. It will, of course, be understood that in certain applications where the appearance provided by the metallized film is not desired, the metalized film can be omitted.

Substrate 18 is provided with one or more conduits 36 adjacent aperture 26. Conduits 36 communicate with the region directly above the insert member 24. These conduits provide ports through which plastic material may be injected to fill the space immediately above the insert member 24 and thereby create overlayer 22. Conduits 36 may be formed in substrate 18 during fabrication of the molding strip stock or they may be drilled or otherwise formed after stamping to create aperture 26.

One suitable way of forming overlayer 22 is to place the molding strip 10 (or a portion of molding strip 10 adjacent aperture 26) in a mold which provides a mold cavity surface which conforms to the desired exterior configuration of the overlayer. In the presently preferred embodiment, the overlayer is generally flush with, or smooth and continuous with, the exterior surface of molding strip 10 defined by cover layer 34. Once the molding strip is in place, plastic material is injected through conduits 36 so that it fills the space above the insert member 24 and below the mold cavity surface. The plastic material is allowed to cure or harden, whereupon the molding strip may be removed from the mold to produce the finished molding strip. The gap 28 defined between the upper portion 32 and the substrate 18 at aperture 26 provides a surface for good bonding to hold insert member 24 in place. Conduits 36, which are preferably angled as shown, also provide a strong mechanical bond, preventing the overlayer 22 from removal. Overlayer 22 also bonds to overlayer 34 and encapsulates or covers and protects the edge 38 of metallized film 20, so that it will not be exposed to the atmosphere and oxidize.

The resulting molding strip is relatively impervious to attack from the elements and presents no protrusions or crevices which might accumulate dirt and road salt. The indica, encapsulated integrally in the molding strip, is highly aesthetic in appearance and durable. Moreover, the molding strip so manufactured is simple and economical to produce in mass production quantities and does not present the problems associated with conventional emblem mounting techniques such as failing adhesive or rusting at the fastener holes.

While the invention has been described in its presently preferred embodiment, it will be understood that the invention is capable of certain modification and change without departing from the spirit of the invention as set forth in the appended claims.

The molding of the present invention is described as molding for an automotive vehicle, a use to which it is particularly well adapted. However, it will be appreciated that the molding of the present invention is well suited for other uses and such uses are contemplated to be within the broad scope of this invention.

What is claimed is:

1. A method of forming a molding strip having an integral insert comprising:
   providing a molding strip;
   forming an aperture in said molding strip;
   positioning an insert into said aperture in said molding strip;
   injecting a transparent plastic material in said aperture overlaying said insert;
   bonding said transparent plastic material to said insert and said molding strip.

2. The method according to claim 1 further comprising:
   forming at least one conduit in said molding strip in fluid communication between said aperture and an outside surface of said molding strip.

3. The method according to claim 1 wherein said forming of said aperture includes stamping said molding strip with a die.

4. The method according to claim 2 wherein said insert has a portion having a circumferential size smaller than said aperture to thereby provide a gap therebetween and said transparent plastic material is injected into said gap.

5. The method according to claim 2 wherein said molding strip has a layer of metallized film having an edge portion located at a perimeter portion of said aperture and said transparent plastic material is injected in said aperture in sealing relationship with said edge portion.

6. The method according to claim 2 wherein said injecting step is carried out by injecting a transparent plastic material having lens magnification properties.

7. The method according to claim 2 wherein said injecting step is carried out by injecting said transparent plastic material into a mold cavity having a mold cavity surface which provides an outside surface of said transparent plastic material which is smooth and continuous with an outside surface of said molding strip.

8. A molding strip for securement to the side body of a vehicle, the molding strip comprising:
   an elongated plastic strip having an aperture in said strip;
   an insert positioned in said aperture;
   indicia on said insert; and
   a transparent plastic material positioned on said insert for securing said insert in said aperture and forming an integral molding strip such that said indicia exhibits aesthetic three-dimensional characteristics.

9. The molding strip according to claim 8 wherein said indicia is formed on said insert such that said indicia being raised a desired distance with respect to said insert.

10. The molding strip according to claim 8 wherein said molding strip includes a clear outer plastic layer.

11. The molding strip according to claim 8 having at least one channel filled with said transparent plastic material and extending from said aperture to an outside surface of said molding strip.

12. The molding strip according to claim 8 wherein said insert has a portion having a circumferential size smaller than said aperture to thereby provide a gap therebetween and said transparent plastic material fills said gap.

13. The molding strip according to claim 8 wherein said molding strip has a layer of metallized film having an edge portion located at a perimeter portion of said aperture and said transparent plastic material is injected in said aperture in sealing relationship with said edge portion.

14. The molding strip according to claim 8 wherein said transparent plastic has lens magnifications properties.

15. The molding strip according to claim 8 wherein said transparent plastic material has an outside surface smooth and continuous with an outside surface of said molding strip.

16. A molding strip for securement to the side body of a vehicle, the molding strip comprising:
   an elongated plastic strip having an aperture in said strip;
   an insert positioned in said aperture, said insert having a surface for carrying indicia thereon;
   indicia on said insert, said indicia being raised a desired distance from said surface of said insert; and
   a transparent plastic material over and bonding said insert to said molding strip, said transparent plastic material having an outside surface smooth and continuous with an outside surface of said molding strip, said molding strip having at least one channel filled with said transparent plastic material and extending from said aperture to an outside surface of said molding strip.

* * * * *